US009165191B2

(12) United States Patent
Sugasawa et al.

(10) Patent No.: US 9,165,191 B2

(45) Date of Patent: Oct. 20, 2015

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventors: Hiroshi Sugasawa, Miyagi-ken (JP); Hidehiro Naito, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 140 days.

(21) Appl. No.: 13/965,384

(22) Filed: Aug. 13, 2013

(65) Prior Publication Data

US 2014/0064559 A1 Mar. 6, 2014

(30) Foreign Application Priority Data

Sep. 3, 2012 (JP) ................................ 2012-193072

(51) Int. Cl.
*G06K 9/00* (2006.01)

(52) U.S. Cl.
CPC ........ *G06K 9/00624* (2013.01); *G06K 9/00671* (2013.01); *G06K 2209/17* (2013.01)

(58) Field of Classification Search
USPC ......... 382/100, 103, 108, 110, 112, 181–231, 382/291, 292, 301, 321; 348/89, 135, 143
See application file for complete search history.

(56) References Cited

U.S. PATENT DOCUMENTS

| | | | | |
|---|---|---|---|---|
| 4,687,107 | A * | 8/1987 | Brown et al. | 209/556 |
| 5,845,002 | A * | 12/1998 | Heck et al. | 382/110 |
| 6,005,959 | A * | 12/1999 | Mohan et al. | 382/110 |
| 6,535,637 | B1 * | 3/2003 | Wootton et al. | 382/190 |
| 7,974,472 | B2 * | 7/2011 | Zou et al. | 382/187 |
| 8,406,475 | B2 * | 3/2013 | Bernard et al. | 382/110 |
| 8,577,145 | B2 * | 11/2013 | Panetta | 382/181 |
| 8,712,163 | B1 * | 4/2014 | Osheroff | 382/195 |
| 8,727,208 | B2 * | 5/2014 | Poisner | 235/375 |
| 8,861,816 | B2 * | 10/2014 | Lang et al. | 382/128 |
| 2010/0232640 | A1 * | 9/2010 | Friend et al. | 382/100 |
| 2014/0079326 | A1 * | 3/2014 | Ito et al. | 382/224 |

FOREIGN PATENT DOCUMENTS

| | | |
|---|---|---|
| JP | 11-232296 | 8/1999 |
| JP | 2001-064160 | 3/2001 |
| JP | 2004-167158 | 6/2004 |
| JP | 2007-172077 | 7/2007 |
| JP | 2008-134731 | 6/2008 |
| JP | 2010-218109 | 9/2010 |
| JP | 2011-002989 | 1/2011 |

OTHER PUBLICATIONS

Japanese Office Action for Japanese Patent Application No. 2012-193072 mailed on Jul. 29, 2014.

* cited by examiner

*Primary Examiner* — Anand Bhatnagar

(74) *Attorney, Agent, or Firm* — Amin, Turocy & Watson, LLP

(57) ABSTRACT

A commodity recognition apparatus detects an appearance feature amount of a commodity included in an image captured by an image capturing unit, extracts a candidate of the commodity included in the captured image by comparing the data of the appearance feature amount with the feature amount data in a recognition dictionary file, recognizes a character string included in the image captured by the image capturing unit, and determines a commodity of a recognition target according to the recognized character string and the extracted candidate of the commodity.

10 Claims, 12 Drawing Sheets

COMMODITY RECOGNITION APPARATUS AND COMMODITY RECOGNITION METHOD

CROSS-REFERENCE TO RELATED APPLICATION

This application is based upon and claims the benefit of priority from Japanese Patent Application No. 2012-193072, filed Sep. 3, 2012, the entire contents of which are incorporated herein by reference.

FIELD

Embodiments described herein relate to a commodity recognition apparatus and a commodity recognition method.

BACKGROUND

There is a technology in which the category of an object is recognized according to the similarity degree calculated such that the feature amount of the object is detected from the image data of the object photographed by an image capturing section and the feature amount detected is compared with the feature amount data registered in the recognition dictionary file to calculate the similarity degree of the object. Such a technology for recognizing the object included in an image is called as a generic object recognition. As to the technologies of the generic object recognition, various recognition technologies are disclosed in the following document.

Keiji Yanai "The Current State and Future Directions on Generic Object Recognition", Journal of Information Processing Society, Vol. 48, No. SIG16 [Search on Heisei 22 August 10], Internet <URL: http://mm.cs.uec.ac.jp/IPSJ-TCVIM-Yanai.pdf>

In addition, the technology carrying out the generic object recognition by area division of the image for each object is described in the following document.

Jamie Shotton etc, "Semantic Texton Forests for Image Categorization and Segmentation", [Search on Heisei 22 August 10], Internet <URL:http://citeseerx.ist.psu.edu/viewdoc/download?doi=10.1.1.145.3036&rep=repl&type-pdf>

In recent years, for example, the generic object recognition technology is proposed to be applied to a recognition apparatus for recognizing a commodity, especially a commodity on which a barcode is not applied, such as vegetables, fruits and the like purchased by a customer in a checkout system (POS system) of a retail store. In this technology, the feature amount data for representing the surface information, such as, appearance shape, color (tint), pattern, and concave-convex (surface roughness) of a recognition target commodity in the form of parameters is stored in the recognition dictionary file. The commodity recognition apparatus detects the feature amount of appearance of a commodity from the image of the commodity captured by the image capturing section and compares the detected feature amount with the feature amount data of each commodity registered in the recognition dictionary file. And then the commodity recognition apparatus outputs a commodity similar in a feature amount to the recognized commodity as a candidate of recognized commodity.

In addition, in the same checkout system, a technology in which a specific character string is recognized from the image data of the object photographed by the image capturing section is also known.

DETAILED DESCRIPTION

In accordance with one embodiment, a commodity recognition apparatus includes a feature amount detection module, a commodity candidate extraction module, a character recognition module and a commodity determination module. The feature amount detection module detects the appearance feature amount of a commodity included in an image captured by an image capturing unit. The commodity candidate extraction module extracts the candidate of the commodity included in the image by comparing the data of the appearance feature amount detected by the feature amount detection module with feature amount data in a recognition dictionary file for storing the feature amount data representing the surface information of a commodity for each commodity of a recognition target. The character recognition module recognizes a character string included in the image captured by the image capturing unit. The commodity determination module determines a commodity of the recognition target according to the character string recognized by the character recognition module and the candidate of the commodity extracted by the commodity candidate extraction module.

Hereinafter, one embodiment of the commodity recognition apparatus is described with reference to the accompanying drawings. In the present embodiment, a scanner apparatus 1 in an ethical pharmacy dealing in medical supplies has a function as a commodity recognition apparatus.

A First Embodiment

Figure 1:
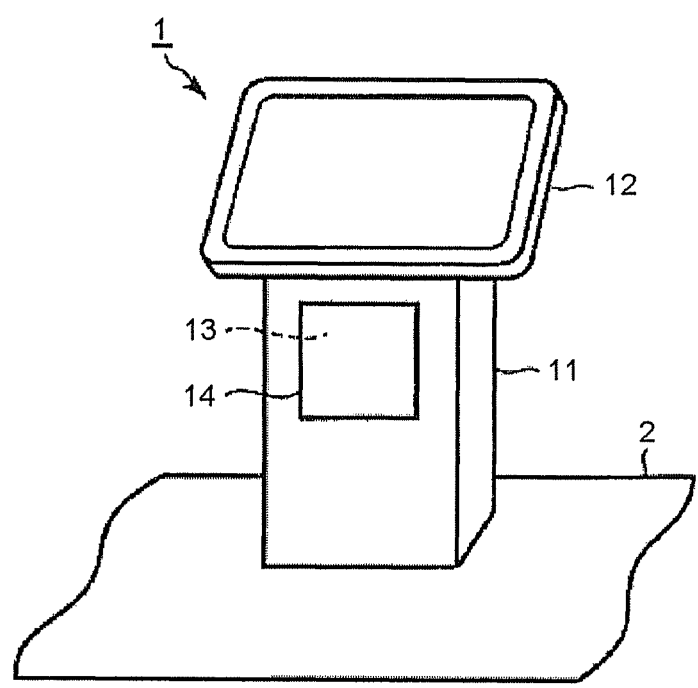
FIG. 1 is an external view of a scanner apparatus according to a first embodiment.

FIG. 1 is an external view of the scanner apparatus 1. The scanner apparatus 1 includes a thin rectangular housing 11 vertically arranged on a counter 2 as a main body. A touch panel 12 is arranged at the top of the housing 11 as an operation & display section.

A CCD camera 13 is installed in the housing 11 as an image capturing unit. A rectangular-shaped reading window 14 is formed at the front of the housing 11. The CCD camera 13 comprises a CCD (Charge Coupled Device) image capturing element as an area image sensor and a drive circuit thereof, and an image capturing lens for focusing the image of an image capturing area on the CCD image capturing element. The image capturing area refers to an area of a frame image focused on the area of the CCD image capturing element through the image capturing lens from the reading window 14. The CCD camera 13 outputs the image of the image capturing area focused on the CCD image capturing element through the image capturing lens.

Figure 2:
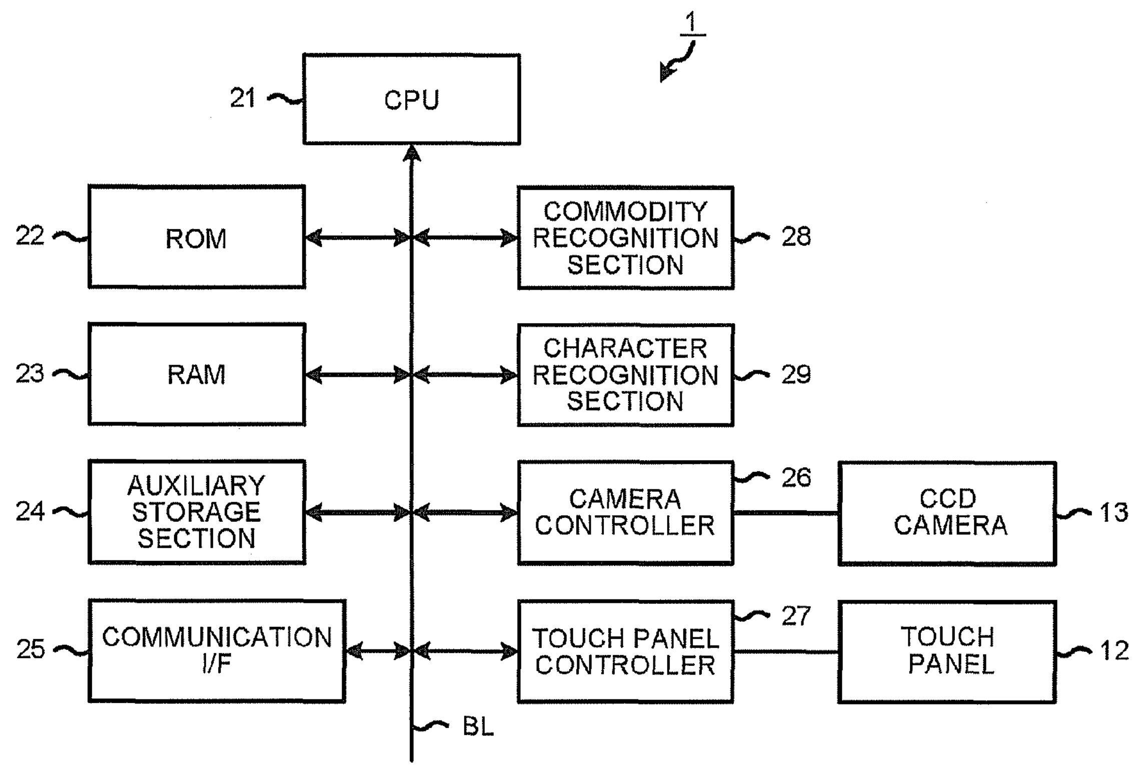
FIG. 2 is a block diagram illustrating a constitution of main portion of the scanner apparatus.

FIG. 2 is a block diagram illustrating a constitution of main portion of the scanner apparatus 1. The scanner apparatus 1 is a computer device comprising a CPU (Central Processing Unit) 21 constituting a main control section, a ROM (Read Only Memory) 22 and a RAM (Random Access Memory) 23 constituting a main storage section. The CPU 21, the ROM 22 and the RAM 23 are connected with a bus line BL such as an address bus line, a data bus line and the like. In addition, an auxiliary storage section 24, a communication interface 25, a camera controller 26, a touch panel controller 27, a commodity recognition section 28 and a character recognition section 29 are connected with the bus line BL mentioned above.

Figure 3:
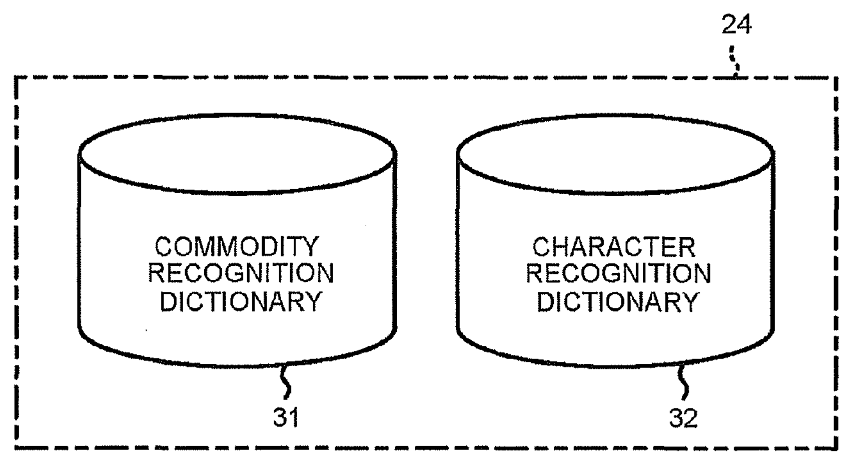
FIG. 3 is a diagram illustrating a main data file stored in an auxiliary storage section of the scanner apparatus.

The auxiliary storage section 24, for example, is a HDD (Hard Disk Drive) apparatus or a SSD (Solid State Drive) apparatus. As shown in FIG. 3, the auxiliary storage section 24 stores a data file such as a commodity recognition dictionary file 31, a character recognition dictionary file 32 and the like besides storing various programs.

The commodity recognition dictionary file 31 stores the feature amount data representing the surface information such as the appearance shape, tint, pattern, and concave-convex and the like of a commodity in the form of parameters in association with the recognition information for each commodity serving as a recognition target. The character recognition dictionary file 32 stores character string feature data digitalizing the feature of the character string for each character string being a recognition target. The commodity name of the commodity being a recognition target is included in the character string.

The communication interface 25 carries out a data communication with an electronic device, e.g., a POS (Point Of Sales) terminal, connected through a communication line. The camera controller 26 drives the CCD camera 13, and acquires the image data captured by the CCD camera 13. The touch panel controller 27 displays an image on the screen of the touch panel 12. In addition, the touch panel controller 27 detects a touch position coordinate on the screen according to the signal of a touch sensor overlaid on the screen.

The commodity recognition section 28 recognizes the commodity included in the captured image by detecting the appearance feature amount of the commodity included in the captured image from the image data captured by the CCD camera 13 according to the program executed under the control of the CPU 21, and comparing the detected appearance feature amount with the feature amount data in the commodity recognition dictionary file 31. The character recognition section 29 recognizes the character string included in the captured image by detecting the feature of each character included in the captured image from the image data captured by the CCD camera 13 according to the program executed under the control of the CPU 21, and comparing the detected feature with the character string feature data in the character recognition dictionary file 32.

Figure 4:
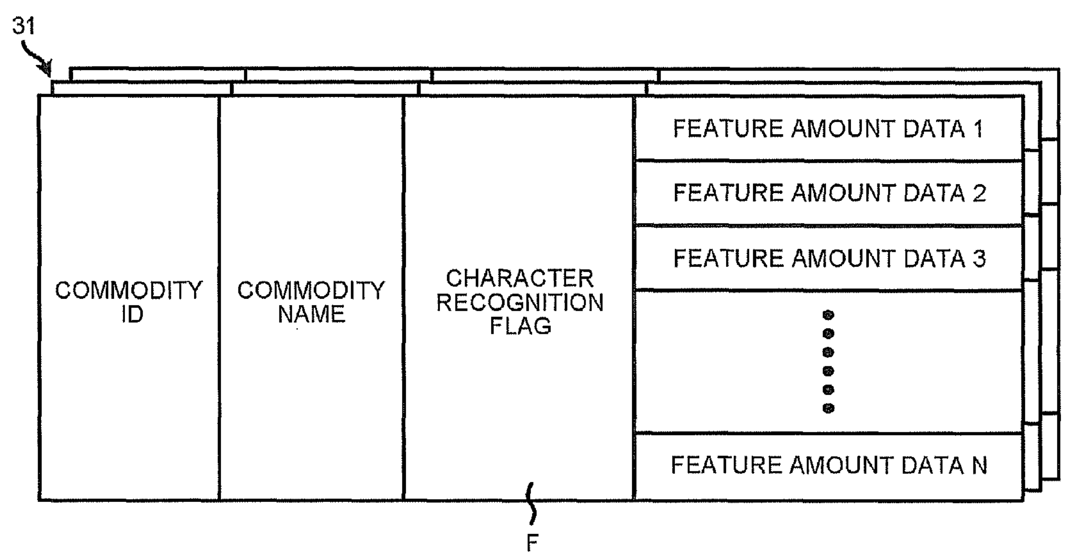
FIG. 4 is a schematic diagram illustrating the structure of dictionary data for each commodity stored in a commodity recognition dictionary file.

FIG. 4 is a schematic diagram illustrating the structure of a dictionary data for each commodity stored in the commodity recognition dictionary file 31. As shown in FIG. 4, in the commodity recognition dictionary file 31, a character recognition flag F and a plurality of feature amount data are stored in association with a commodity ID and a commodity name for recognizing the commodity for each commodity of a recognition target. The character recognition flag F is set to "1", if the commodity recognized by the corresponding commodity ID needs a character recognition, or reset to "0" if the commodity recognized by the corresponding commodity ID does not need the character recognition. For example, as medical supplies, commodities which hardly have a difference in appearance thoseof but respectively have different medicine names need the character recognition, and therefore, the character recognition flag F is set to "1". The commodity recognition dictionary file 31 functions as a flag storage section storing the flag for distinguishing whether or not the commodity needs the character recognition for each commodity.

The feature amount data represent the appearance feature amount serving as surface information (appearance shape, tint, pattern, and concave-convex and the like) of the commodity discriminated by the corresponding commodity ID in the form of parameters including a plurality of bit strings, and the feature amount data 1–N for one commodity which is observed from various directions are respectively stored. The number N of feature amount data for one commodity is not fixed. In addition, the number N of feature amount data is different from one another according to commodity.

Figure 5:
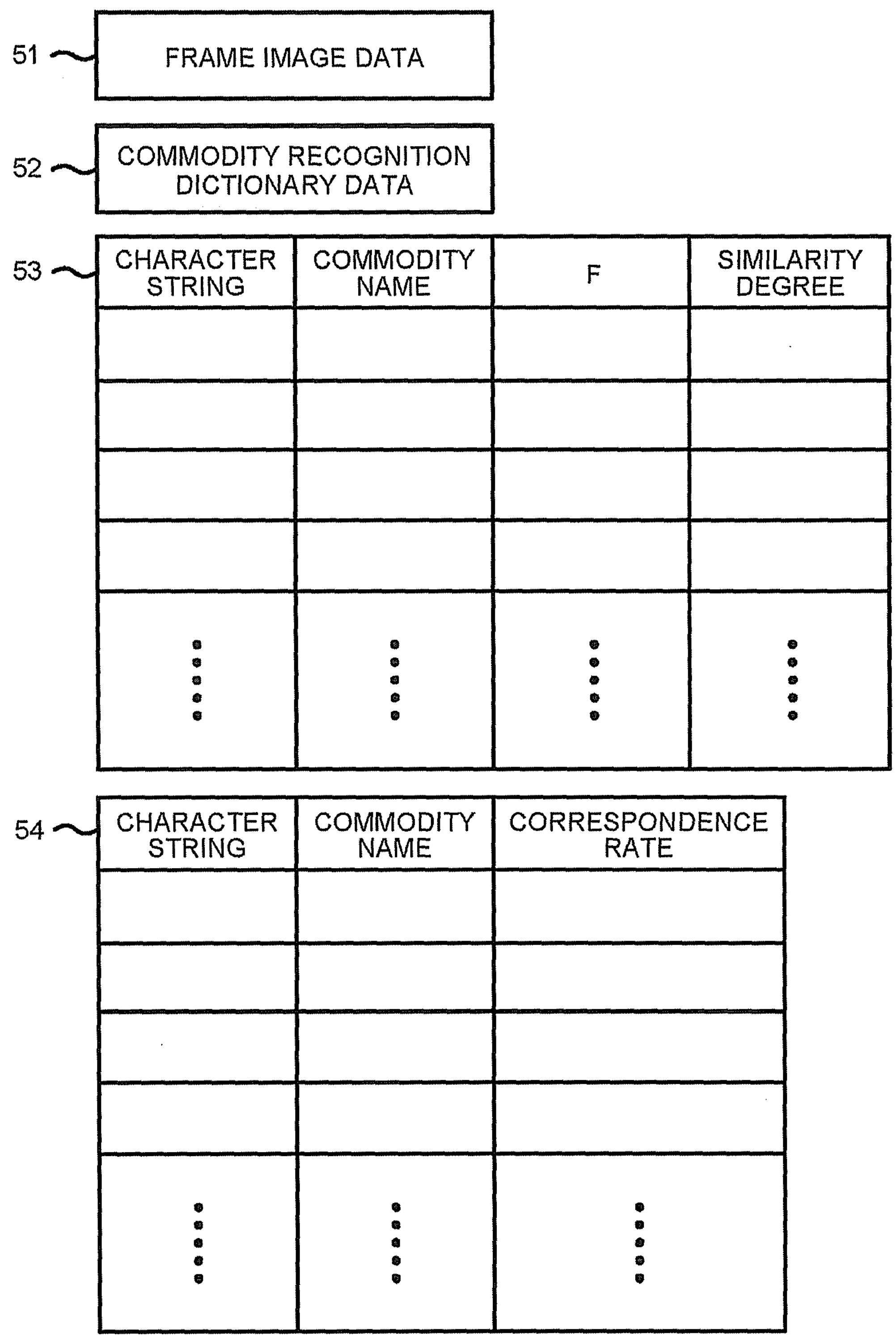
FIG. 5 is a diagram illustrating a main memory area formed in a RAM of the scanner apparatus.

FIG. 5 is a schematic diagram illustrating a main memory area formed in the RAM 23. As shown in FIG. 5, the scanner apparatus 1 forms an image data memory 51, a dictionary data memory 52, a similarity degree determination table 53 and a correspondence rate determination table 54 in the RAM 23. The image data memory 51 temporarily stores the frame image of the image capturing area captured by the CCD camera 13. The dictionary data memory 52 temporarily stores the dictionary data for each commodity read out of the commodity recognition dictionary file 31. The similarity degree determination table 53 stores a plurality of recodes including each item data of a commodity ID, a commodity name, a character recognition flag F and a similarity degree as one record. The correspondence rate determination table 54 stores a plurality of recodes including each item data of a character string, a commodity name and a correspondence rate as one record.

Figure 6:
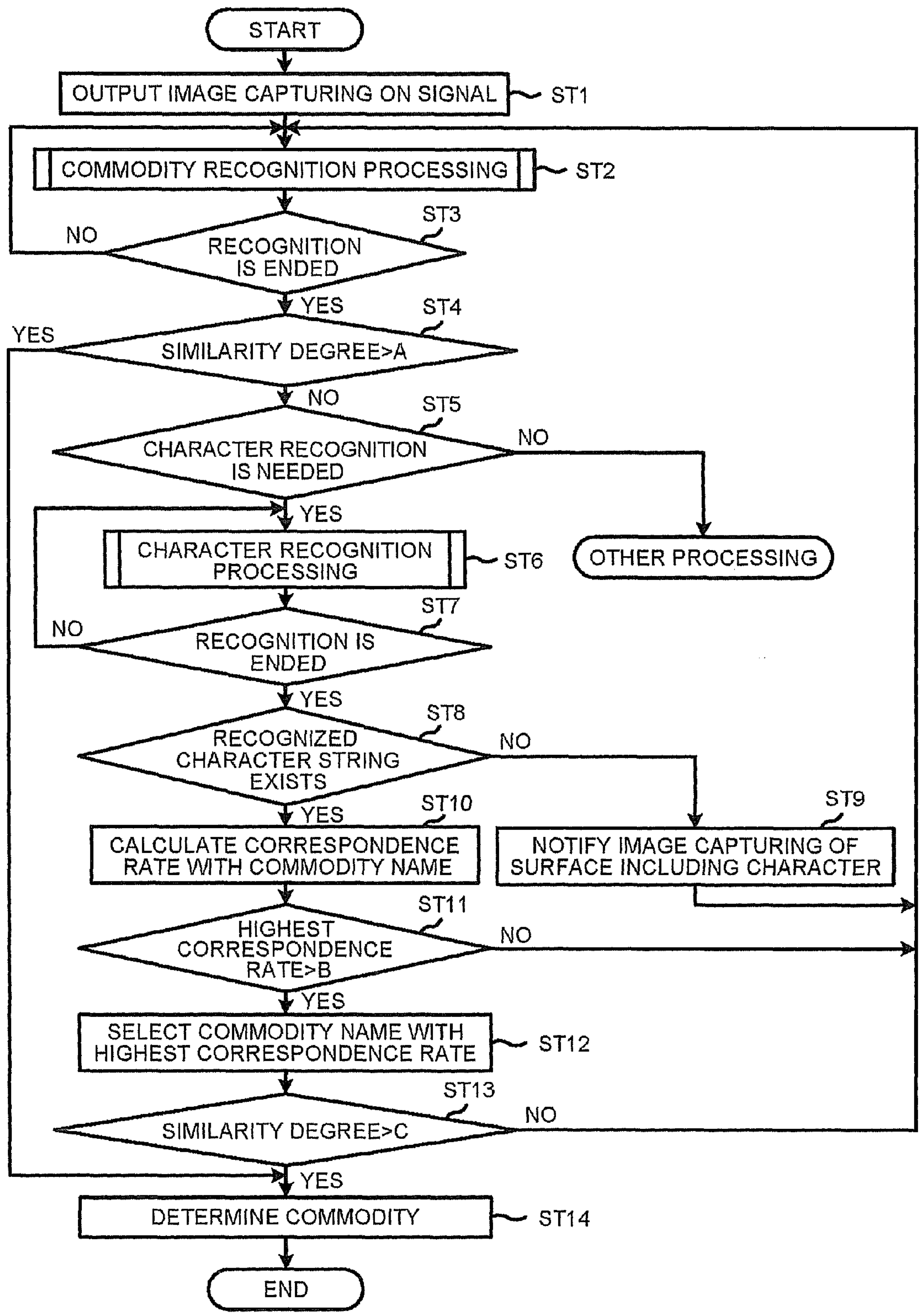
FIG. 6 is a flowchart illustrating the main procedure of the information processing executed by a CPU of the scanner apparatus according to a commodity recognition program in the first embodiment.

FIG. 6 is a flowchart illustrating the main procedure of the information processing executed by the CPU 21 according to a commodity recognition program stored in the ROM 22 serving as a program storage section or the auxiliary storage section 24. Namely, when the commodity recognition program is started, the CPU 21 outputs an image capturing on-signal to the camera controller 26 (ACT ST1). The camera controller 26 starts the CCD camera 13 according to the image capturing on-signal. Thus, the CCD camera 13 starts photographing of the image capturing area. The frame images of the image capturing area captured by the CCD camera 13 are acquired in sequence by the camera controller 26, and are stored in an image buffer.

Figure 7:
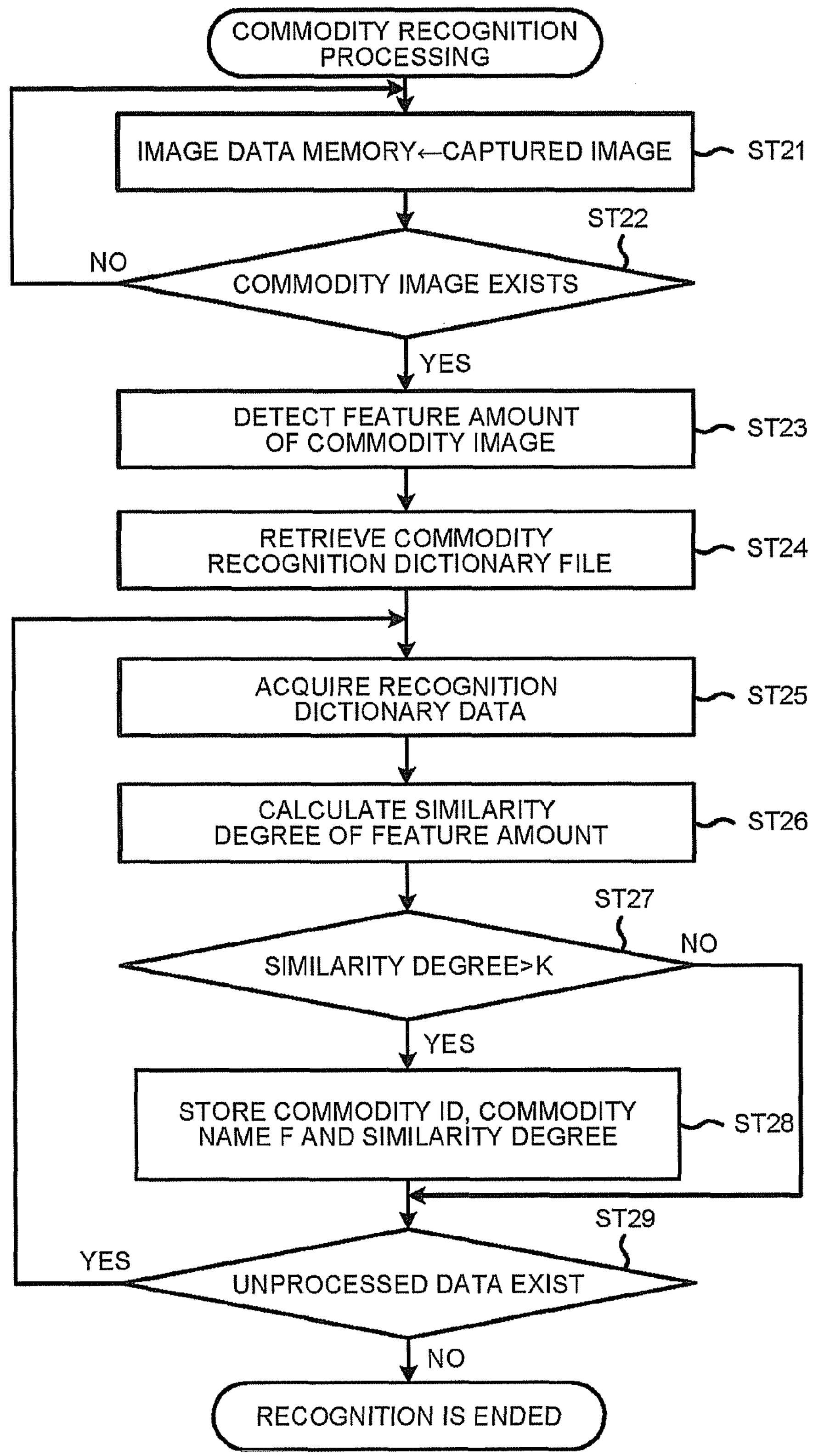
FIG. 7 is a flowchart illustrating the main procedure of the information processing executed by a commodity recognition section of the scanner apparatus according to the first embodiment.

After outputting the image capturing on-signal, the CPU 21 instructs the commodity recognition section 28 to execute commodity recognition processing (ACT ST2). Upon receiving the instruction, the commodity recognition section 28 starts the commodity recognition processing illustrated in FIG. 7.

First, the commodity recognition section 28 acquires the frame image of the image capturing area from the image buffer. Then, the commodity recognition section 28 writes the data of the frame image in the image data memory 51 (ACT ST21).

Next, the commodity recognition section 28 confirms whether or not the frame image stored in the image data memory 51 includes a commodity image (ACT ST22). Specifically, the commodity recognition section 28 extracts a contour line and the like from the binary image of the frame image. The commodity recognition section 28 tries to extract the contour of an object imaged in the frame image. If the contour of the object is extracted, the commodity recognition section 28 regards the image in the contour as a commodity image.

If the commodity image is not included in the frame image (NO in ACT ST22), the commodity recognition section 28 acquires a new (next) frame image from the image buffer, and overwrites the new frame image in the image data memory 51 (ACT ST21). The commodity recognition section 28 further confirms whether or not the frame image stored in the image data memory 51 includes a commodity image (ACT ST22).

If the commodity image is included in the frame image (YES in ACT ST22), the commodity recognition section 28 detects the feature amount on appearance (appearance feature amount) such as the shape, tint, pattern, and concave-convex and the like of the commodity from the image in the contour which is regarded as a commodity (ACT ST23: feature amount detection module).

After the detection of the appearance feature amount is ended, the commodity recognition section 28 retrieves the commodity recognition dictionary file 31 (ACT ST24). Afterwards, the commodity recognition section 28 acquires the unprocessed dictionary data for each commodity (the commodity ID, the commodity name, the character recognition flag F, the plurality of feature amount data) from the commodity recognition dictionary file 31, and writes it in the dictionary data memory 52 (ACT ST25).

The commodity recognition section 28 calculates the similarity degree indicating how similar are the data of the appearance feature amount detected in the processing in ACT ST23 to the feature amount data in the dictionary data for each commodity written in the dictionary data memory 52 (ACT ST26). The greater the similarity degree is, the higher the similarity rate is. In the present embodiment, the upper limit of the similarity degree is set to "100". The similarity degree may be a value acquired based on the feature amount of the image captured by the image capturing unit (CCD camera 13 in the present embodiment) and the feature amount stored in the dictionary. For example, the similarity degree includes a correspondence degree (correspondence rate) denoting the degree of correspondence or a correlation value denoting the degree of correlation, and the like.

When the similarity degree is calculated, the commodity recognition section 28 confirms whether or not the similarity degree calculated is higher than a specified reference threshold value K (ACT ST27). The reference threshold value K is the lower limit value of the similarity degree of the commodity which should be retained as a registration commodity candidate. If the upper limit value of the similarity degree is set to "100" as described above, the reference threshold value K, for example, is set to "20", which is one fifth of the upper limit value of the similarity degree.

If the similarity degree is lower than the reference threshold value K (NO in ACT ST27), the commodity having the dictionary data for each commodity written in the dictionary data memory 52 is not the commodity retained as a registration commodity candidate. In such a case, the commodity recognition section 28 proceeds to the processing in ACT ST29.

If the similarity degree is higher than the reference threshold value K (YES in ACT ST27), the commodity having the dictionary data for each commodity written in the dictionary data memory 52 is the commodity retained as a registration commodity candidate. In such a case, the commodity recognition section 28 adds the commodity ID, the commodity name and the character recognition flag F in the dictionary data memory 52 and the similarity degree calculated in the processing in ACT ST26 to the similarity degree determination table 53 as a record of the registration commodity candidate (ACT ST28: commodity candidate extraction module). Afterwards, the commodity recognition section 28 proceeds to the processing in ACT ST29.

In ACT ST29, the commodity recognition section 28 confirms whether or not there is unprocessed dictionary data for each commodity in the commodity recognition dictionary file 31. If the unprocessed dictionary data for each commodity exists in the commodity recognition dictionary file 31 (YES in ACT ST29), the commodity recognition section 28 returns to the processing in ACT ST25. Namely, the commodity recognition section 28 executes the processing in ACT ST26-ACT ST28 after acquiring the unprocessed dictionary data for each commodity from the commodity recognition dictionary file 31 and overwriting it in the dictionary data memory 52.

In this way, after the processing in ACT ST25-ACT ST28 is executed for all the dictionary data for each commodity stored in the commodity recognition dictionary file 31 (NO in ACT ST29), the commodity recognition section 28 notifies the end of the commodity recognition processing to the CPU 21.

The CPU 21 waits for the notice that the commodity recognition processing is ended (ACT ST3). Upon receiving the notice that the commodity recognition processing is ended (YES in ACT ST3), the CPU 21 confirms whether or not there is only one similarity degree higher than a determination threshold value A in the similarity degree of the registration commodity candidate stored in the similarity degree determination table 53 (ACT ST4). The determination threshold value A is a value of the similarity degree which allows that the commodity extracted as a registration commodity candidate in the commodity recognition processing is determined as the commodity included in the image data in the image data memory 51. The determination threshold value A is set to "75", for example, that is relatively close to the upper limit value in a case that the upper limit value of the similarity degree is set to "100" as described above.

If only one commodity of which the similarity degree is higher than the determination threshold value A exists in the registration commodity candidate (YES in ACT ST4), the commodity is determined as a registration commodity. The CPU 21 displays the commodity name and the like of the determined commodity on the touch panel 12 (ACT ST14).

If no commodity of which the similarity degree is higher than the determination threshold value A exists or more than two commodities of which each similarity degree is higher than the determination threshold value A exist (NO in ACT ST4), the registration commodity is not determined. In such a case, the CPU 21 determines whether or not the character recognition processing is needed with reference to the similarity degree determination table 53 (ACT ST5: determination module).

If at least one record in which the character recognition flag F is set to "1" exists in the similarity degree determination table 53, the character recognition processing is needed. On the contrary, if the record in which no character recognition flag F is set to "1" exists, the character recognition processing is not needed. If the character recognition processing is not needed (NO in ACT ST5), the CPU 21 proceeds to the processing of determining the registration commodity from the registration commodity candidate recognized in the commodity recognition processing.

Figure 8:
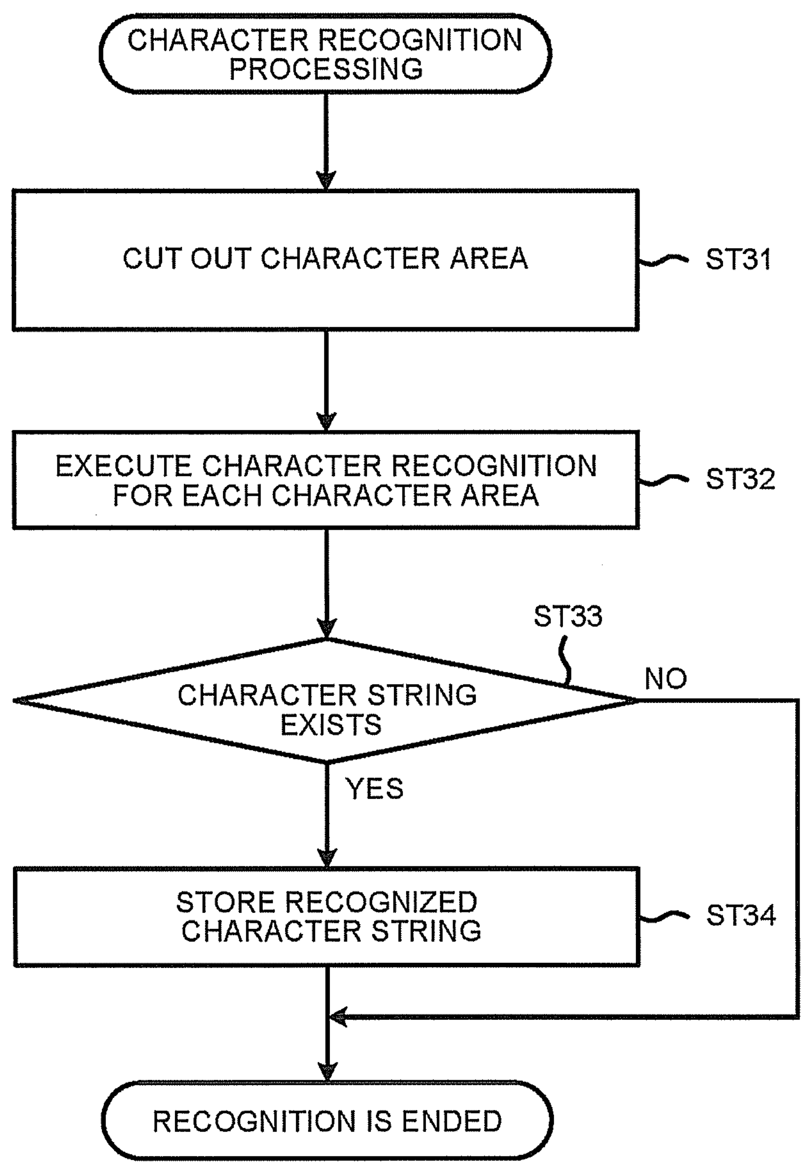
FIG. 8 is a flowchart illustrating the main procedure of the information processing executed by a character recognition section of the scanner apparatus according to the first embodiment.

In a case that the character recognition processing is needed (YES in ACT ST5), the CPU 21 instructs the character recognition section 29 to execute the character recognition processing (ACT ST6). Upon receiving the instruction, the character recognition section 29 starts the character recognition processing illustrated in FIG. 8.

First, the character recognition section 29 cuts out an area including character from the frame image in the image data memory 51 (ACT ST31). Afterwards, the character recognition section 29 detects the feature of the character for each character area, and compares the feature of the detected character with the character string feature data registered in the character recognition dictionary file 32 to recognize the character string in the character area (ACT ST32: character recognition module).

The character recognition section 29 determines whether or not the character string can be recognized (ACT ST33). If none of the character strings can be recognized (NO in ACT ST33), the character recognition section 29 notifies the end of the character recognition processing to the CPU 21.

If at least one character string is recognized (YES in ACT ST33), the character recognition section 29 stores all the recognized character strings in a character string area of the correspondence rate determination table 54 in sequence (ACT ST34). Afterwards, the character recognition section 29 notifies the CPU 21 of the end of the character recognition processing.

The CPU 21 waits for the notice that the character recognition processing is ended (ACT ST7). Upon receiving the notice that the character recognition processing is ended (YES in ACT ST7), the CPU 21 confirms whether or not the character string data are stored in the character string area of the correspondence rate determination table 54 (ACT ST8). If the character string data are not stored in the character string area of the correspondence rate determination table 54 (NO in ACT ST8), the CPU 21 displays a message instructing that the surface on which the commodity name is printed is held over the reading window 14 on the touch panel 12 to notify a user of it (ACT ST9: notification module). Afterwards, the CPU 21 executes the commodity recognition processing in ACT ST2 again.

If the character string data are stored in the character string area of the correspondence rate determination table 54 (YES in ACT ST8), the CPU 21 calculates the correspondence rate for each character string with the commodity name of the registration commodity candidate stored in the similarity degree determination table 53. The CPU 21 finds out the commodity name with the highest correspondence rate for each character string, and stores the commodity name and the correspondence rate in the correspondence rate determination table 54 in association with the character string (ACT ST10).

Afterwards, the CPU 21 detects the highest correspondence rate from the correspondence rate determination table 54. Then, the CPU 21 confirms whether or not the highest correspondence rate is higher than an available threshold value B (ACT ST11). The available threshold value B is a value of the correspondence rate which allows determination of the commodity name even though the corresponding character string lacks a part of the commodity name. The available threshold value B is set to "75", for example.

If the highest correspondence rate is lower than the available threshold value B (NO in ACT ST11), the commodity name is not determined. In this case, the CPU 21 executes the commodity recognition processing in ACT ST2 again.

If the highest correspondence rate is equal to or higher than the available threshold value B (YES in ACT ST11), the commodity name stored in the correspondence rate determination table 54 corresponding to the highest correspondence rate is determined to be the commodity name estimated according to the character string recognized from the frame image in the image data memory 51. In this case, the CPU 21 selects the commodity name corresponding to the highest correspondence rate from the correspondence rate determination table 54 (ACT ST12) Afterwards, the CPU 21 retrieves the similarity degree determination table 53 with the commodity name, and confirms whether or not the similarity degree corresponding to the commodity name is equal to or higher than a quasi determination threshold value C (ACT ST13). The quasi determination threshold value C is a value of the similarity degree which allows that the commodity extracted as a registration commodity candidate in the commodity recognition processing is determined as the commodity included in the image data in the image data memory 51 according to the commodity name recognized in the character recognition processing. The quasi determination threshold value C is set to a value lower than the determination threshold value A, for example, "50".

If the similarity degree for the commodity of the commodity name selected from the correspondence rate determination table 54 is lower than the quasi determination threshold value C (NO in ACT ST13), the registration commodity is not determined as the commodity of this commodity name. In this case, the CPU 21 executes the commodity recognition processing in ACT ST2 again.

If the similarity degree for the commodity of the commodity name selected from the correspondence rate determination table 54 is equal to or higher than the quasi determination threshold value C (YES in ACT ST13), the registration commodity is determined as the commodity of this commodity name. The CPU 21 displays the commodity name and the like of the determined commodity on the touch panel 12 (ACT ST14).

Figure 9:
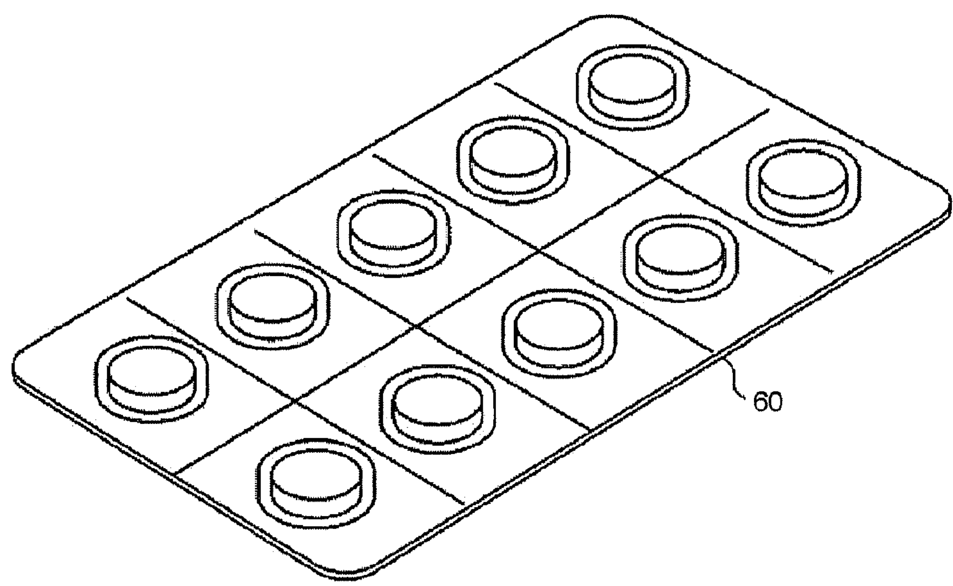
FIG. 9 is a perspective view illustrating the front side of a tablet medicine.
Figure 10:
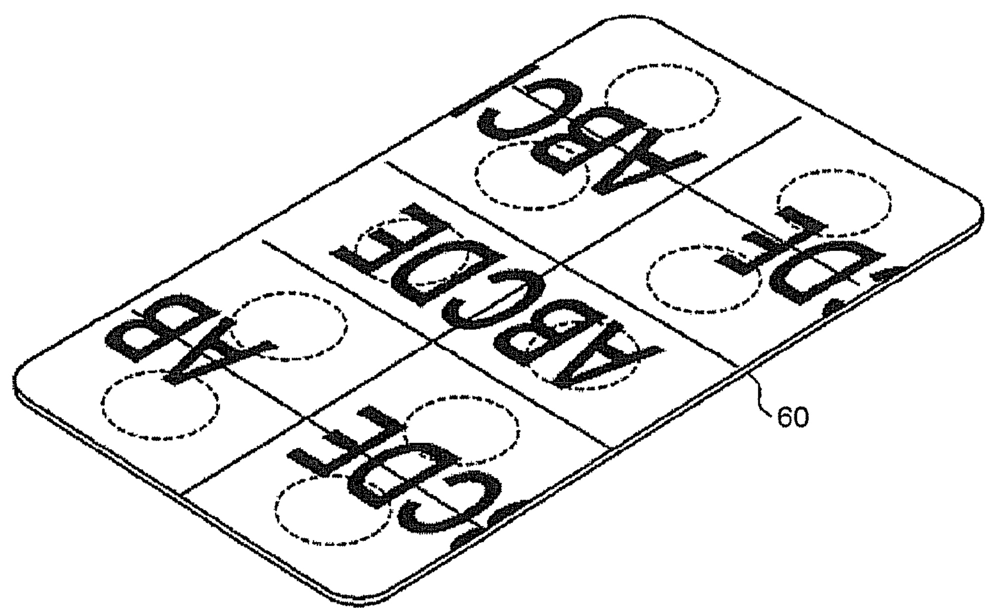
FIG. 10 is a perspective view illustrating the back side of the tablet medicine.

FIG. 9 is a perspective view of the front side of a tablet medicine 60 which is an example of a commodity recognized by the scanner apparatus 1. FIG. 10 is a perspective view of the back side of the tablet medicine 60. The tablet medicine 60 is printed with the medicine name "ABODE" on the back side. However, since the medicine name "ABCDE" is randomly printed, as shown in FIG. 10, the character strings "CDE", "AB", "DE" or "ABC" lacking a part of the medicine name "ABCDE" also exists.

In the commodity recognition dictionary file 31, the feature amount data 1-N obtained when the front side and back side of the tablet medicine 60 are observed at various angles are stored as a dictionary data relating to this medicine 60. In addition, the character recognition flag F is set to "1".

Assuming that a user holds the front side surface of the tablet medicine 60 over the reading window 14 of the scanner apparatus 1. In this state, the commodity recognition processing is executed on the image of the front side surface of the tablet medicine 60 in the scanner apparatus 1. As a result, if there are more than two registration commodity candidates, including tablet medicine 60, of which the similarity degrees are higher than the determination threshold value A. In such a case, the registration commodity is not determined by the scanner apparatus 1.

The tablet medicine 60 of which the character recognition flag F is set to "1" is included in the registration commodity candidates. Therefore, in the scanner apparatus 1, the character recognition processing is executed subsequently. However, the character cannot be recognized according to the image of the front side surface of the tablet medicine 60. Therefore, the message instructing that the surface on which the commodity name is printed is held over the reading window 14 is displayed on the touch panel 12.

The user holds the back side surface of the tablet medicine 60 over the reading window 14 of the scanner apparatus 1. Thus, in the scanner apparatus 1, the commodity recognition processing is executed on the image of the back side surface of the tablet medicine 60. As a result, if there also are more than two registration commodity candidates, including the tablet medicine 60, of which the similarity degrees are higher than the determination threshold value A. In such a case, in the scanner apparatus 1, the registration commodity is not also determined.

The registration commodity candidates include the tablet medicine 60 of which the character recognition flag F is set to "1". Therefore, in the scanner apparatus 1, the character recognition processing is executed subsequently. At this time, the character strings "ODE", "AB", "DE", "ABC" and "ABODE" are recognized. At the moment, in the similarity degree determination table 53, the data of the tablet medicine 60, namely the data including the medicine name "ABODE", are registered. In addition, it is assumed that the commodity names completely consistent with the character strings "CDE", "AB", "DE" and "ABC" lacking a part of the medicine name "ABODE" do not exist. In such a condition, the correspondence rate of the character strings "ODE" and "ABC" with the medicine name "ABODE" is 60%, the correspondence rate of the character strings "AB" and "DE" with the medicine name "ABODE" is 40%, and the correspondence rate of the character string "ABODE" with the medicine name "ABODE" is 100%. Therefore, the highest correspondence rate is 100%, and moreover, is higher than the available threshold value B. Therefore, the medicine name "ABODE" is selected in the scanner apparatus 1. Moreover, since the similarity degree of the record including the medicine name "ABODE" is higher than the determination threshold value A, namely, is higher than the quasi determination threshold value C, the tablet medicine 60 with the medicine name "ABCDE" is determined as a registration commodity in the scanner apparatus 1.

According to the present embodiment, by simultaneously using the commodity recognition processing and the character recognition processing, a high recognition rate can be achieved in the determination of the registration commodity even in the case that a plurality of commodities hardly having any difference on appearance, for example, medical supplies, are included as a recognition target commodity. In addition, so long as a difference exists on the appearance of the commodity to be recognized, the registration commodity can also be determined with a quite high recognition rate even though the commodity name is the same.

A Second Embodiment

In the first embodiment, as shown in FIG. 6, the commodity recognition processing is carried out first, and the character recognition processing is carried out subsequently. However, the same effect as the first embodiment can be also achieved even though the character recognition processing is executed first and the commodity recognition processing is executed subsequently.

Figure 12:
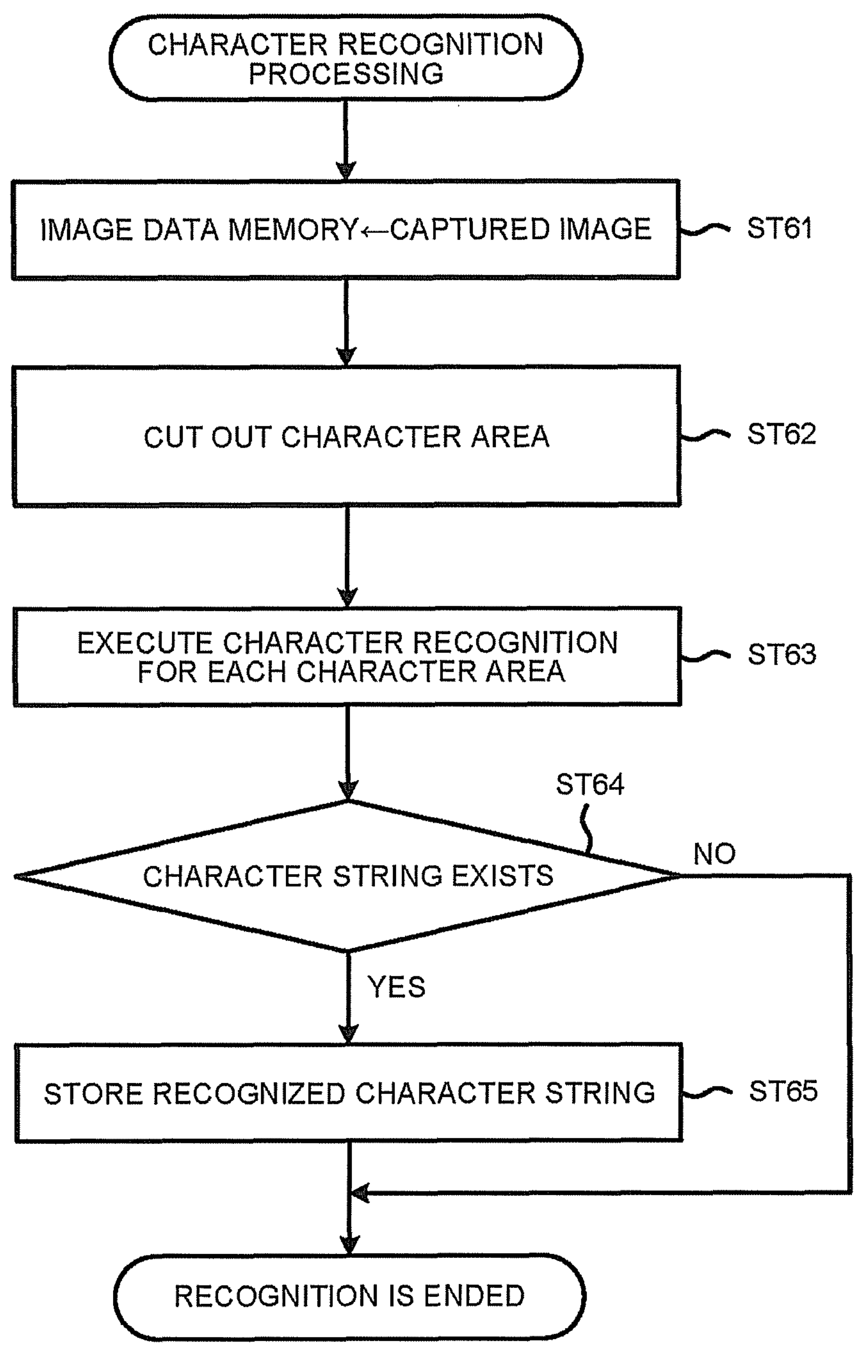
FIG. 12 is a flowchart illustrating the main procedure of the information processing executed by the commodity recognition section of the scanner apparatus according to the second embodiment.
Figure 13:
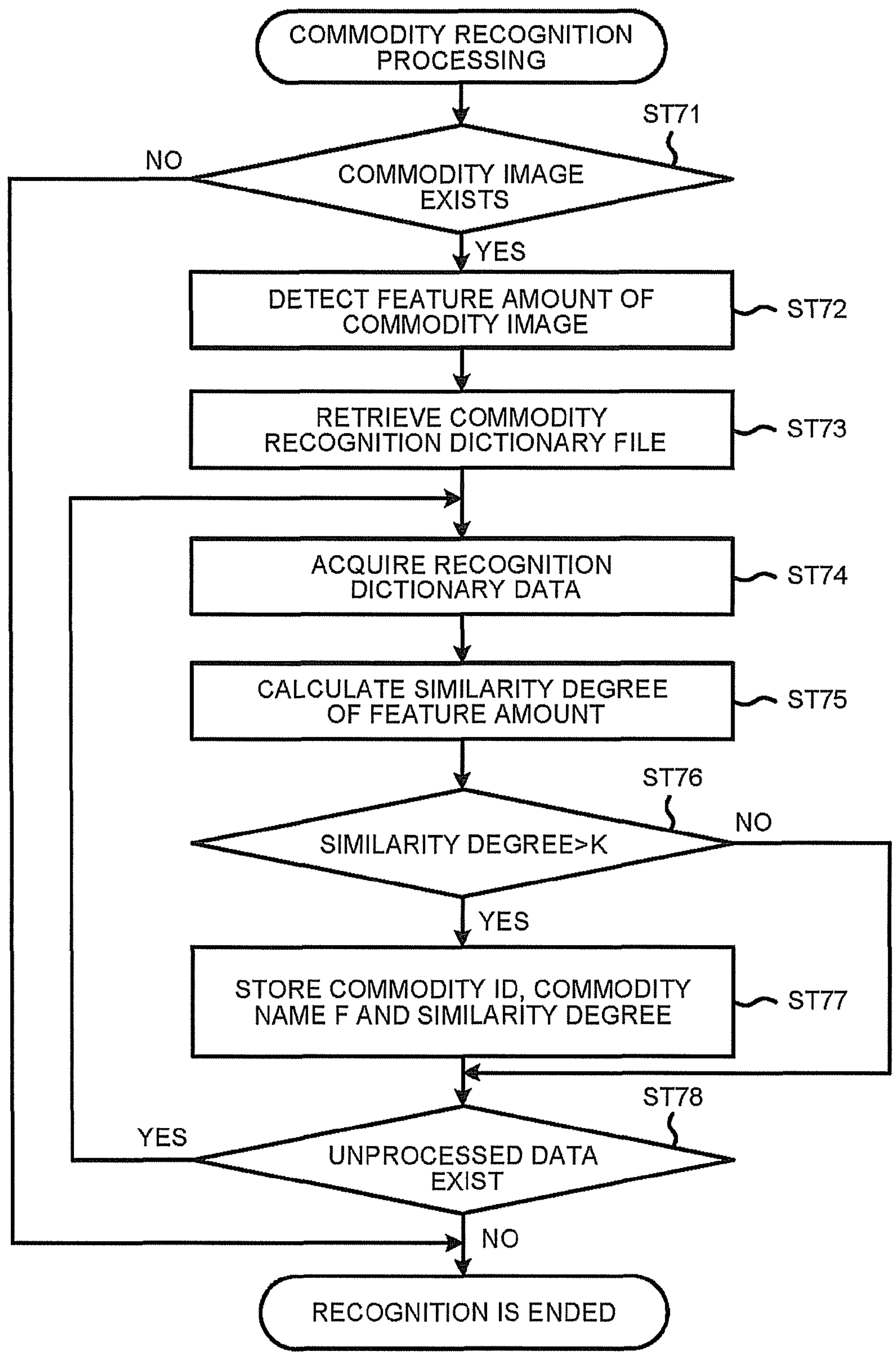
FIG. 13 is a flowchart illustrating the main procedure of the information processing executed by the character recognition section of the scanner apparatus according to the second embodiment.

Hereinafter, the second embodiment in which the character recognition processing is executed first and the commodity recognition processing is executed subsequently is described with reference to FIG. 11 to FIG. 13. In the second embodiment also, similar to the first embodiment, the scanner apparatus 1 in the ethical dispensing pharmacy dealing in medical supplies have the function as the commodity recognition apparatus, and constitution of the scanner apparatus 1 and the data structures of the commodity recognition dictionary file 31 and the character recognition dictionary file 32 are common with those of the first embodiment. Therefore, the same numerals are applied to similar elements and the detailed descriptions thereof are omitted.

Figure 11:
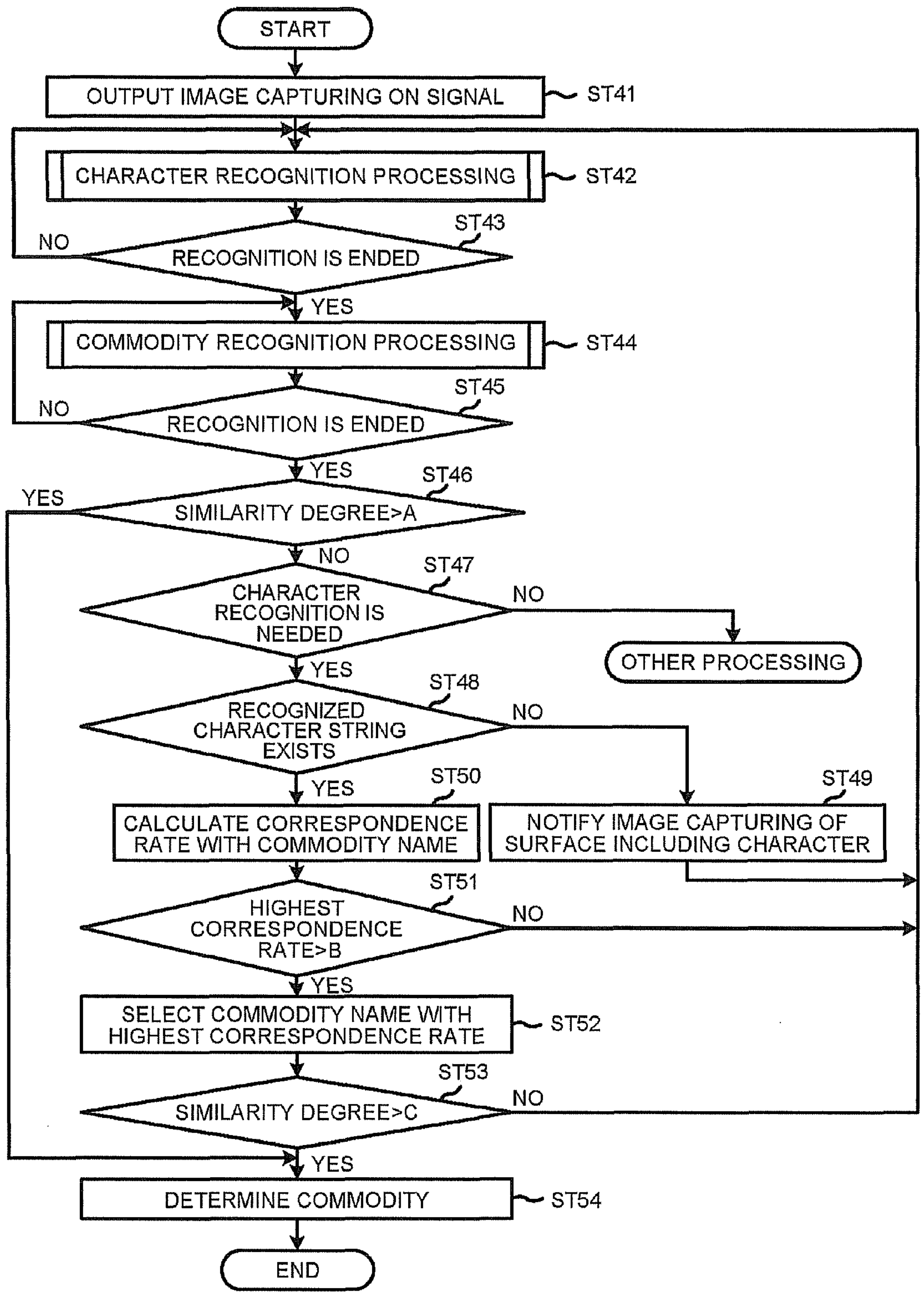
FIG. 11 is a flowchart illustrating the main procedure of the information processing executed by the CPU of the scanner apparatus according to the commodity recognition program in a second embodiment.

FIG. 11 is a flowchart illustrating the main procedure of the information processing executed by the CPU 21 according to the commodity recognition program in the second embodiment. Namely, when the commodity recognition program is started, the CPU 21 outputs the image capturing on-signal to the camera controller 26 (ACT ST41). Next, the CPU 21 instructs the character recognition section 29 to execute the character recognition processing (ACT ST42). Upon receiving the instruction, the character recognition section 29 starts the character recognition processing illustrated in FIG. 12.

First, the character recognition section 29 acquires the frame image of the image capturing area from the image buffer. Then, the character recognition section 29 writes the data of the frame image in the image data memory 51 (ACT ST61). Next, the character recognition section 29 cuts out the area including the character from the frame image in the image data memory 51 (ACT ST62). The character recognition section 29 detects the feature of the character for each character area, and compares the feature with the character string feature data registered in the character recognition dictionary file 32 to recognize the character string in the character area (ACT ST63: character recognition module).

The character recognition section 29 determines whether or not the character string can be recognized (ACT ST64). If none of the character strings can be recognized (NO in ACT ST64), the character recognition section 29 notifies the end of the character recognition processing to the CPU 21.

If at least one character string is recognized (YES in ACT ST64), the character recognition section 29 stores all the recognized character strings in the character string area of the correspondence rate determination table 54 in sequence (ACT ST65). Afterwards, the character recognition section 29 notifies the end of the character recognition processing to the CPUI 21.

The CPU 21 waits for the notice that the character recognition processing is ended (ACT ST43). Upon receiving the notice that the character recognition processing is ended (YES in ACT ST43), the CPU 21 instructs the commodity recognition section 28 to execute the commodity recognition processing (ACT ST44). Upon receiving the instruction, the commodity recognition section 28 starts the commodity recognition processing in the procedures in ACT ST71-ACT ST78 illustrated in FIG. 13. The commodity recognition processing is the same as that in the procedures in ACT ST22-ACT ST29 in the first embodiment. Namely, after extracting the commodity image from the frame image stored in the image data memory 51 (YES in ACT ST71), the commodity recognition section 28 detects the feature amount on appearance (appearance feature amount) such as the shape, surface tint, pattern, concave-convex and the like of the commodity from the image in the contour regarded as the image of the commodity (ACT ST72: feature amount detection module). Next, the commodity recognition section 28 calculates the similarity degree for each commodity representing how similar is the data of the appearance feature amount to the feature amount data of the dictionary data for each commodity stored in the commodity recognition dictionary file 31 (ACT ST73-ACT ST75), and adds the commodity ID, the commodity name, the character recognition flag F and the similarity degree of the commodity of which the similarity degree is equal to or higher than the reference threshold value K to the similarity degree determination table 53 as a record of the registration commodity candidate (ACT ST76, ACT ST77: commodity candidate extraction module).

After the processing in ACT ST74-ACT ST77 is executed for all the dictionary data for each commodity (NO in ACT ST78), the commodity recognition section 28 notifies the end of the commodity recognition processing to the CPU 21.

The CPU 21 waits for the notice that the commodity recognition processing is ended (ACT ST45). Upon receiving the notice that the commodity recognition processing is ended (YES in ACT ST45), the CPU 21 confirms whether or not only one similarity degree equal to or higher than the determination threshold value A exists in the similarity degrees of the registration commodity candidates stored in the similarity degree determination table 53 (ACT ST46).

If only one commodity of which the similarity degree is equal to or higher than the determination threshold value A exists in the registration commodity candidates (YES in ACT ST46), the commodity is determined as a registration commodity. The CPU 21 displays the commodity name and the like of the determined commodity on the touch panel 12 (ACT ST54).

If the commodity of which the similarity degree is equal to or higher than the determination threshold value A does not exist or more than two commodities of which the similarity degrees are equal to or higher than the determination threshold value A exist (NO in ACT ST46), the registration commodity is not determined. In such a condition, the CPU 21 determines whether or not the character recognition processing is needed with reference to the similarity degree determination table 53 (ACT ST47: determination module). If the character recognition processing is not needed (NO in ACT ST47), the CPU 21 proceeds to the processing of determining the registration commodity from the registration commodity candidate recognized in the commodity recognition processing.

If the character recognition processing is needed (YES in ACT ST47), the CPU 21 confirms whether or not the character string data are stored in the character string area of the correspondence rate determination table 54 (ACT ST48). If the character string data are not stored in the character string area of the correspondence rate determination table 54 (NO in ACT ST48), the CPU 21 displays the message instructing that the surface on which the commodity name is printed is held over the reading window 14 on the touch panel 12 to notify it to the user (ACT ST49: notification module). Afterwards, the CPU 21 executes the commodity recognition processing of ACT ST42 again.

If the character string data are stored in the character string area of the correspondence rate determination table 54 (YES in ACT ST48), the CPU 21 calculates the correspondence rate for each character string with the commodity name of the registration commodity candidate stored in the similarity degree determination table 53. Afterwards, the CPU 21 finds out the commodity name with the highest correspondence rate for each character string, and stores the commodity name and the correspondence rate in the correspondence rate determination table 54 in association with the character string (ACT ST50).

Afterwards, the CPU 21 detects the highest correspondence rate from the correspondence rate determination table 54. Then, the CPU 21 confirms whether or not the highest correspondence rate is equal to or higher than the available threshold value B (ACT ST51). If the highest correspondence rate is lower than the available threshold value B (NO in ACT ST51), the CPU 21 executes the commodity recognition processing in ACT ST42 again.

If the highest correspondence rage is equal to or higher than the available threshold value B (YES in ACT ST51), the CPU 21 selects the commodity name corresponding to the highest correspondence rate from the correspondence rate determination table 54 (ACT ST52). The CPU 21 retrieves the similarity degree determination table 53 with the commodity name to confirm whether or not the similarity degree corresponding to the commodity name is equal to or higher than the quasi determination threshold value C (ACT ST53). If the similarity degree is lower than the quasi determination threshold value C (NO in ACT ST53), the CPU 21 executes the commodity recognition processing in ACT ST42 again.

If the similarity degree corresponding to the commodity of the commodity name selected from the correspondence rate determination table 54 is equal to or higher than the quasi determination threshold value C (YES in ACT ST53), the registration commodity is determined as a commodity of this commodity name. The CPU 21 displays the commodity name and the like of the determined commodity on the touch panel 12 (ACT ST54).

In the second embodiment with such procedures also, the effect the same as that of the first embodiment can be also achieved. However, in the second embodiment, the character recognition processing is certainly executed, but in the first embodiment, the character recognition processing is executed only in the case that the character recognition is confirmed to be needed according to the status of the character recognition flag F, and therefore, compared with the second embodiment, the processing load in the first embodiment is small.

The present embodiment is not limited to the embodiments mentioned above.

For example, in the embodiments mentioned above, the character string recognized in the character recognition processing is determined as a commodity name, but besides the commodity name, for example, a maker name can be also recognized. In addition, the determination threshold value A, the available threshold value B, the quasi determination threshold value C and the reference threshold value K exemplified in the embodiments mentioned above are not limited to the values of the embodiments, and of course, suitable values can be set according to a purpose of use, respectively.

The recognition target in the present embodiments is described on the medical supplies as an example, but is not limited to that. For example, separately packaged food (for example, sweets such as a candy and the like), separately packaged daily necessaries (for example, a battery and the like), or industrial goods such as a screw, a bolt and the like, can be also used as a recognition target.

In addition, the embodiment shows the case that a single scanner apparatus 1 has the function of the commodity recognition apparatus, but a checkout system constituted with the scanner apparatus 1 and the POS terminal can also has the function of the commodity recognition apparatus. In such a case, the commodity recognition dictionary file 31 and the character recognition dictionary file 32 can be also provided to the POS terminal instead of the scanner apparatus 1. Alternatively, the dictionary file mentioned above can be also provided in a store server acting as a higher level server of the POS terminal.

In addition, in the embodiment, a control method realizing the function of the present invention is prerecorded in the method storage section inside the apparatus. However, it is not limited to this. The same method can be also downloaded to the apparatus from a network. Alternatively, the same method recorded in a recording medium can be also installed in the apparatus. So long as the recording medium is an apparatus which can store the method such as a CD-ROM, a memory card and the like, and furthermore, is readable to an apparatus, its form can be random. In addition, the function acquired by the installation and the downloading of the method can be also realized by cooperating an OS (Operating System) and the like inside the apparatus. Moreover, the method of the present embodiment can be also incorporated in a mobile phone with a communication function and a portable information terminal such as a so-called PDA to realize the function.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:

a feature amount detection module configured to detect an appearance feature amount of a commodity included in an image captured by an image capturing unit;

a commodity candidate extraction module configured to extract a candidate of the commodity included in the image by comparing the data of the appearance feature amount detected by the feature amount detection module with the feature amount data in a recognition dictionary file storing feature amount data representing the surface information of a commodity for each commodity which is a recognition target;

a determination module configured to determine whether or not character recognition is required from the candidate of the commodity extracted as the candidate by the commodity candidate extraction module;

a character recognition module configured to recognize a character string included in the image captured by the image capturing unit, if the determination module determines that the character recognition is required; and a commodity determination module configured to determine a commodity of a recognition target according to the character string recognized by the character recognition module and the candidate of the commodity extracted by the commodity candidate extraction module.

2. The commodity recognition apparatus according to claim 1, wherein the commodity determination module determines, as a commodity of the recognition target, the commodity including the character string recognized by the character recognition module in its commodity name from the candidate of the commodity extracted by the commodity candidate extraction module.

3. The commodity recognition apparatus according to claim 1, further comprising:

a flag storage section configured to store a flag for distinguishing whether or not the character recognition is required for each commodity of the recognition target, wherein the determination module is configured to determine whether or not the character recognition is required according to the flag for the commodity extracted as the candidate by the commodity candidate extraction module.

4. The commodity recognition apparatus according to claim 3, further comprising:

a notification unit configured to notify a result of the character recognition if the result of executing the character recognition module is that the character string cannot be recognized from the image captured by the image capturing unit.

5. The commodity recognition apparatus according to claim 3, wherein the character recognition module is executed if the determination module determines that the character recognition is required for the commodity.

6. A commodity recognition method, including:

detecting an appearance feature amount of a commodity included in an image captured;

comparing the data of the detected appearance feature amount with a stored feature amount data representing surface information of a commodity for each commodity of a recognition target to extract a candidate of the commodity included in the image captured;

determining whether or not character recognition is required from the candidate of the commodity extracted as the candidate;

recognizing a character string included in the image captured, if it is determined that the character recognition is required; and determining a commodity of the recognition target according to the recognized character string and the candidate of the extracted commodity.

7. A commodity recognition apparatus, comprising:

an interface which captures an image captured by a camera; and a processor, the processor executing the following:

detecting an appearance feature amount of a commodity included in the image captured by the camera;

comparing data of the appearance feature amount of the commodity with feature amount data in a recognition dictionary file storing feature amount data representing surface information of a commodity for each commodity which is a recognition target;

determining whether or not the character recognition is required from the candidate of the commodity extracted as the candidate;

recognizing a character string included in the image captured by the camera, if the determination module determines that the character recognition is required; and determining a commodity of a recognition target from the candidate of the commodity according to the character string recognized.

8. The commodity recognition apparatus according to claim 7, wherein the processor determines, as a commodity of the recognition target, the commodity including the character string recognized in its commodity name from the candidate of the commodity.

9. The commodity recognition apparatus according to claim 7, further comprising:

a memory configured to store a flag for distinguishing whether or not the character recognition is required for each commodity of the recognition target, wherein the processor determines whether or not the character recognition is required according to the flag for the commodity extracted as the candidate.

10. The commodity recognition apparatus according to claim 9, wherein the processor notifies a result of the character recognition if the result of executing the character recognition module is that the character string cannot be recognized.

* * * * *